United States Patent
Govindan (10) Patent No.: US 11,625,308 B2
(45) Date of Patent: Apr. 11, 2023

(54) MANAGEMENT OF ACTIVE-ACTIVE CONFIGURATION USING MULTI-PATHING SOFTWARE

(71) Applicant: Dell Products L.P., Round Rock, TX (US)

(72) Inventor: Balasundaram Govindan, Bangalore (IN)

(73) Assignee: Dell Products L.P., Round Rock, TX (US)

(*) Notice: Subject to any disclaimer, the term of this patent is extended or adjusted under 35 U.S.C. 154(b) by 89 days.

(21) Appl. No.: 17/474,186

(22) Filed: Sep. 14, 2021

(65) Prior Publication Data

US 2023/0081355 A1  Mar. 16, 2023

(51) Int. Cl.
*G06F 11/20* (2006.01)
(52) U.S. Cl.
CPC ........ *G06F 11/201* (2013.01); *G06F 2201/85* (2013.01)
(58) Field of Classification Search
CPC ................... G06F 11/201; G06F 2201/85
See application file for complete search history.

(56) References Cited

U.S. PATENT DOCUMENTS

| | | | |
|---|---|---|---|
| 6,567,397 B1 | 5/2003 | Campana et al. | |
| 6,687,746 B1 | 2/2004 | Shuster et al. | |
| 6,697,875 B1 | 2/2004 | Wilson | |
| 6,766,359 B1 * | 7/2004 | Oliveira | G06F 11/201 710/39 |
| 7,275,103 B1 | 9/2007 | Thrasher et al. | |
| 7,454,437 B1 | 11/2008 | Lavallee et al. | |

(Continued)

FOREIGN PATENT DOCUMENTS

| | | | | |
|---|---|---|---|---|
| CA | 2642145 A1 * | 8/2008 | ......... | G06F 11/2058 |
| CN | 103677927 B | 2/2017 | | |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Matthew M Kim
*Assistant Examiner* — Indranil Chowdhury
(74) *Attorney, Agent, or Firm* — Ryan, Mason & Lewis, LLP (57) ABSTRACT

An apparatus comprises a host device that includes a multi-path input-output (MPIO) driver configured to control delivery of input-output (IO) operations from the host device to first and second storage systems over selected paths through a network. The MPIO driver is further configured to identify a connectivity failure between the host device and a given one of the first and second storage systems, to generate a message comprising one or more details of the connectivity failure, and to send the message to a remaining one of the first and second storage systems over at least one path of a plurality of paths between the host device and the remaining one of the storage systems. The first and second storage systems in some embodiments are arranged in an active-active configuration relative to one another, with one being designated as a non-bias and the other as a bias storage system.

20 Claims, 4 Drawing Sheets

(56) References Cited

U.S. PATENT DOCUMENTS

| | | | |
|---|---|---|---|
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,770,059 B1* | 8/2010 | Glade | G06F 11/2089 |
| | | | 709/224 |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,825,919 B1 | 9/2014 | Lim et al. | |
| 8,832,334 B2 | 9/2014 | Okita | |
| 8,874,746 B1 | 10/2014 | Gonzalez | |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,764,371 B2 | 9/2020 | Rao et al. | |
| 10,789,006 B1 | 9/2020 | Gokam et al. | |
| 10,817,181 B2 | 10/2020 | Mallick et al. | |
| 10,838,648 B2 | 11/2020 | Sharma et al. | |
| 10,880,217 B2 | 12/2020 | Mallick et al. | |
| 10,884,935 B1 | 1/2021 | Doddaiah | |
| 10,911,402 B2 | 2/2021 | Pusalkar et al. | |
| 11,308,004 B1* | 4/2022 | Rao | G06F 13/1668 |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0248245 A1* | 11/2006 | Ninomiya | G06F 3/0607 |
| | | | 710/68 |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0201458 A1 | 8/2008 | Salli | |
| 2008/0301332 A1 | 12/2008 | Butler et al. | |
| 2009/0132740 A1* | 5/2009 | Kai | G06F 11/2089 |
| | | | 710/5 |
| 2009/0259749 A1 | 10/2009 | Barrett et al. | |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0021653 A1 | 1/2020 | Rao et al. | |
| 2020/0097203 A1* | 3/2020 | Mallick | G06F 13/102 |
| 2020/0106698 A1* | 4/2020 | Rao | G06F 3/067 |
| 2020/0110552 A1 | 4/2020 | Kumar et al. | |
| 2020/0112608 A1 | 4/2020 | Patel et al. | |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0241890 A1 | 7/2020 | Mallick et al. | |
| 2020/0314218 A1 | 10/2020 | Kumar et al. | |
| 2020/0348860 A1 | 11/2020 | Mallick et al. | |
| 2020/0348861 A1 | 11/2020 | Marappan et al. | |
| 2020/0348869 A1 | 11/2020 | Gokam | |
| 2020/0349094 A1* | 11/2020 | Smith | H04L 67/1029 |
| 2020/0363985 A1 | 11/2020 | Gokam et al. | |
| 2020/0372401 A1 | 11/2020 | Mallick et al. | |
| 2021/0019054 A1 | 1/2021 | Anchi et al. | |
| 2021/0026551 A1 | 1/2021 | Tidke et al. | |
| 2021/0026650 A1 | 1/2021 | Rao et al. | |
| 2021/0099521 A1* | 4/2021 | Sethuraman | G06F 13/102 |
| 2021/0103506 A1* | 4/2021 | Marappan | H04L 67/55 |
| 2021/0157502 A1 | 5/2021 | Rao et al. | |
| 2021/0181965 A1 | 6/2021 | Anchi et al. | |
| 2021/0382800 A1* | 12/2021 | Lee | G06F 11/20 |
| 2022/0334931 A1* | 10/2022 | Tylik | G06F 3/065 |

FOREIGN PATENT DOCUMENTS

| | | | |
|---|---|---|---|
| EP | | 1117028 A2 | 7/2001 |
| EP | | 2667569 A1 | 11/2013 |
| WO | PCT/US2019/052549 | | 12/2019 |
| WO | PCT/US2019/053204 | | 12/2019 |
| WO | PCT/US2019/053473 | | 12/2019 |
| WO | PCT/US2019/067144 | | 5/2020 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "DELL EMC SC Series Storage and Microsoft Multipath I/O," CML 1004, Jul. 2018, 36 pages.

VMware, INC. "VMware VMFS vol. Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

Dell Technologies, "Dell EMC PowerMax and VMAX All Flash: SRDF/Metro Overview and Best Practices," Sep. 2020, 120 pages.

Dell EMC, "Using SRDF/Metro in a VMware Metro Storage Cluster Running Oracle E-Business Suite and 12 C RAC," Nov. 2016, 102 pages.

Wikipedia, "Split-brain (computing)," https://en.wikipedia.org/w/index.php?title=Split-brain_(computing) &oldid=964293205, Jun. 24, 2020, 2 pages.

VMware, "VMware vSphere Metro Storage Cluster (vMSC) with Dell EMC PowerMax and VMAX SRDF/Metro (Partner Verified (56) References Cited

OTHER PUBLICATIONS and Supported)" https://kb.vmware.com/s/article/2134684, May 8, 2020, 9 pages.

* cited by examiner

MANAGEMENT OF ACTIVE-ACTIVE CONFIGURATION USING MULTI-PATHING SOFTWARE

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery over paths from the host devices to storage ports of the storage system. The storage ports are typically limited in number and each has limited resources for handling IO operations received from the host devices. Different ones of the host devices can run different applications with varying workloads and associated IO patterns. The storage systems can have multiple storage arrays configured in an active-active storage configuration, e.g., data stored in one of the storage arrays can be replicated to another one of the storage arrays utilizing a synchronous replication process. One illustrative reason for an active-active storage configuration is to provide data services with continuous availability to applications which demand high resiliency and cannot afford downtime. Such high availability solutions may be designed with third party mediator arrays (referred to herein as "witness arrays") to manage inconsistencies between replicated storage arrays (e.g., split-brain scenarios). However, solutions that use witness arrays require stable connectivity and management of the witness array, which can increase the probability of failure.

SUMMARY

Illustrative embodiments configure a multi-path layer of one or more host devices to include connectivity failure identification and notification functionality in connection with paths utilized to communicate with multiple storage systems, such as first and second storage systems arranged in an active-active configuration. The paths illustratively comprise paths through a storage area network (SAN) or other type of network over which one or more host devices communicate with a storage array or other type of storage system.

The multi-path layer illustratively comprises at least one multi-path input-output (MPIO) driver configured to process IO operations of at least one host device that communicates with multiple distinct storage arrays or other types of storage systems. The multi-path layer in such arrangements includes failure notification logic configured to identify a connectivity failure between a host device and a given one of the first and second storage systems, and to generate a message comprising one or more details of the connectivity failure. The message may include an information packet payload identifying a number of unavailable paths between the host device and the given one of the first and second storage systems, and is sent to a remaining one of the first and second storage systems over at least one path between the host device and the remaining one of the first and second storage systems.

In one or more embodiments, one storage system of the first and second storage systems is designated as a non-bias storage system and the other storage system of the first and second storage systems is designated as a bias storage system. A bias storage system (e.g., array) is a designated one of the storage systems to be used for IO operations in the event of a failure of the other one of the storage systems and/or connectivity problems. The storage systems respectively include non-bias advertising and acknowledgment logic, which is used by the storage systems to send messages to each other. For example, the non-bias storage system advertises its non-bias role to the bias storage system. The non-bias advertising and acknowledgment logic of the bias storage system generates and sends a message back to the non-bias storage system acknowledging the non-bias status.

In different scenarios as explained in more detail herein, the designated bias storage system may maintain or switch its designation as the bias storage system depending on whether the designated bias storage system receives the message from the host device comprising the one or more details of the connectivity failure. Similarly, the designated non-bias storage system may maintain or switch its designation as the non-bias storage system depending on whether the designated non-bias storage system receives the message from the host device comprising the one or more details of the connectivity failure.

Advantageously, illustrative embodiments provide techniques for using multi-pathing software to eliminate dependency on witness arrays when orchestrating active-active clusters. More specifically, with failure identification logic in host device MPIO drivers, and non-bias advertising and acknowledgment logic in storage systems of active-active configurations, the embodiments effectively handle IO path, storage system, host connectivity and Remote Data Facility (RDF) link failures without third party mediator (e.g., witness) arrays. The embodiments address failure scenarios without using a witness configuration, and instead rely on an automated bias approach where, based on whether connectivity failure details are received from a host device, one of the storage systems is automatically used for IO operations in the event of a failure of the other one of the storage systems, connectivity problems between the storage systems and/or connectivity problems between a host device and one of the storage systems.

These and other drawbacks of conventional practice are avoided in illustrative embodiments. As a result, such embodiments can provide improved performance in processing of IO operations. Moreover, these embodiments can facilitate data replication or migration across multiple storage systems using an active-active configuration, thereby providing more efficient protection against failures.

In one embodiment, an apparatus comprises a host device that includes an MPIO driver configured to control delivery of IO operations from the host device to first and second storage systems over selected paths through a network. The MPIO driver is further configured to identify a connectivity failure between the host device and a given one of the first and second storage systems, to generate a message comprising one or more details of the connectivity failure, and to send the message to a remaining one of the first and second storage systems over at least one path of a plurality of paths between the host device and the remaining one of the storage systems.

The first and second storage systems in some embodiments are arranged in an active-active configuration relative to one another, although other arrangements are possible in other embodiments.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
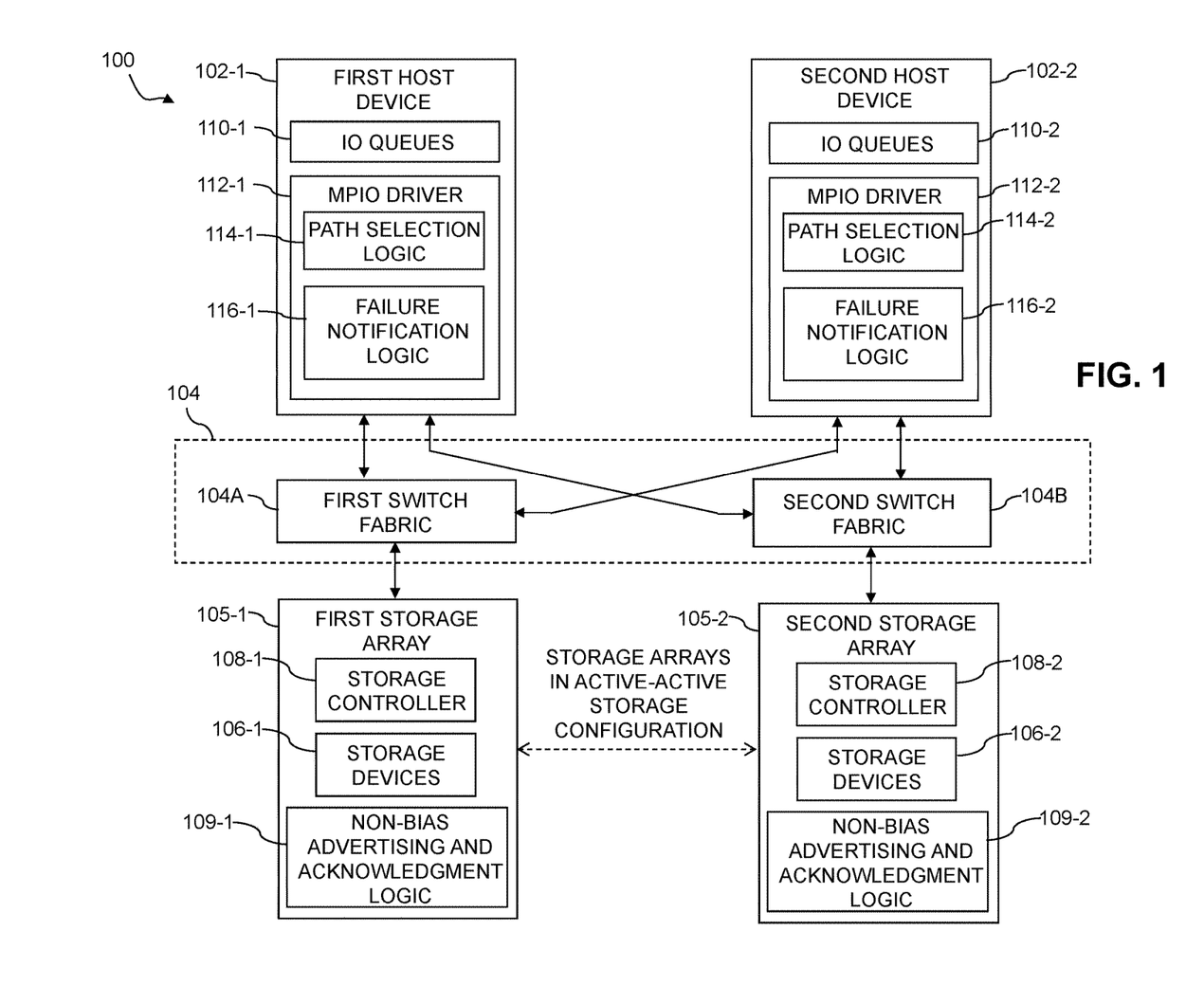
FIG. 1 is a block diagram of an information processing system configured with functionality for connectivity failure identification and notification utilizing a multi-path layer of a host device in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises at least first and second switch fabrics 104A and 104B. The host devices 102 communicate over the network 104 via switch fabrics 104A and 104B with at least first and second storage arrays 105-1 and 105-2, collectively referred to herein as storage arrays 105. For example, the network 104 illustratively comprises at least one storage area network (SAN) and the switch fabrics 104A and 104B illustratively comprise respective distinct switch fabrics of a set of multiple switch fabrics interconnecting the host devices 102 with the storage arrays 105 over the one or more SANs. Each of the switch fabrics 104A and 104B in some embodiments is associated with a different SAN.

The system 100 is configured such that the first host device 102-1 communicates with the first storage array 105-1 over the first switch fabric 104A and communicates with the second storage array 105-2 over the second switch fabric 104B. Similarly, the second host device 102-2 communicates with the first storage array 105-1 over the first switch fabric 104A and communicates with the second storage array 105-2 over the second switch fabric 104B. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102, two switch fabrics 104A and 104B and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more Unity™ or PowerMax™ storage arrays, commercially available from Dell Technologies. As another example, one or both of the storage arrays 105 may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Small Computer System Interface (SCSI), Internet SCSI (iSCSI), Serial Attached SCSI (SAS) and Serial Advanced Technology Attachment (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 are illustratively arranged in an active-active storage configuration, although other storage configurations can be used in other embodiments. In an example of an active-active storage configuration that may be used, data stored in one of the storage arrays 105 is replicated to the other one of the storage arrays 105 utilizing a synchronous replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active storage configurations include "metro" or "stretched" high availability storage array configurations. The term "active-active storage configuration" as used herein is therefore intended to be broadly construed.

The storage arrays 105-1 and 105-2 are therefore assumed to be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

The synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. Thus, while one or more embodiments illustratively described herein apply to synchronous replication, the system may also be configured for asynchronous replication.

It is assumed that the storage controllers 108 of the respective storage arrays 105 each comprise replication control logic and a snapshot generator. The replication control logic illustratively controls performance of the above-noted synchronous replication process, or other replication processes in other embodiments. The snapshot generator is used to generate snapshots of one or more storage volumes that are subject to synchronous replication in conjunction with active-active storage clustering. Again, other types of storage configurations can be used in other embodiments.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for synchronous replication between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112. The multi-path layer further provides functionality for connectivity failure identification and notification. Such functionality is provided at least in part using respective instances of respective instances of failure notification logic 116-1 and 116-2 implemented within the MPIO drivers 112.

The MPIO drivers 112 may comprise, for example, otherwise conventional MPIO drivers, such as PowerPath® drivers from Dell Technologies, suitably modified in the manner disclosed herein to provide functionality for connectivity failure identification and notification. Other types of MPIO drivers from other driver vendors may be suitably modified to incorporate functionality for connectivity failure identification and notification as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured with path selection logic 114-1 to control delivery of IO operations from the host device 102-1 to the first and second storage arrays 105 over selected paths through the network 104. In addition, MPIO driver 112-1 of host device 102-1 is configured with failure notification logic 116-1, which identifies connectivity failures between the host device 102-1 and respective ones of the storage arrays 105-1 and 105-2. The connectivity failure corresponds to, for example, a failure of at least one path of a plurality of paths between the host device and a given one of the storage arrays 105 and/or a failure of one of the storage arrays 105. The failure notification logic 116-1 confirms the connectivity issues and generates and sends a message comprising, for example, an information packet payload comprising details of the connectivity failure. The message is set over one or more available paths to the array without connectivity issues. The payload is referred to herein as a "SUDDENPATHFALL" payload.

For example, a storage volume with two storage arrays 105-1 and 105-2 may initially have "n" valid paths from a host device 102-1. In the event one of the storage arrays 105-1 or 105-2 fails and/or a connection(s) to the array 105-1 or 105-2 is terminated, the number of paths to the remaining array becomes, for example, n/2 (assuming there was an equal number of paths to each of the storage arrays 105), less than n/2 or another number of remaining paths (number of paths prior to the failure reduced by the paths to the failed array or corresponding to the failed connection). The path failure identification logic 116-1 identifies the connectivity failure, which may occur suddenly, and sends the "SUDDENPATHFALL" payload to the remaining array. In one or more embodiments, the payload includes an alert code indicating a number of paths being deducted from the original number of paths.

Each of the storage arrays 105-1 and 105-2 include non-bias advertising and acknowledgment logic 109-1 and 109-2. As noted herein, one of the storage arrays 105-1 or 105-2 is designated as a non-bias array, and the other of the storage arrays 105-1 and 105-2 is designated as a bias array. Such designation may be performed, for example, during configuration of the system 100 by, for example, an administrator, or during automated operations as described herein where the storage arrays 105-1 and 105-2 self-designate based on a particular set of circumstances. The bias array is a designated one of the arrays to be used for IO operations in the event of a failure of the other one of the storage arrays and/or connectivity problems.

Each instance of the non-bias advertising and acknowledgment logic 109-1 and 109-2 is configured to generate and send messages between the storage arrays 105-1 and 105-2 in the active-active configuration. In an example message, one of the storage arrays 105-1 or 105-2, which is designated as the non-bias array, advertises its non-bias role to the other array, which is designated as the bias array. In the following examples in FIGS. 4A-4D, arrays S1 and S2 are understood to be the same or similar to the storage arrays 105-1 or 105-2, including instances of storage devices 106, storage controllers 108 and non-bias advertising and acknowledgment logic 109.

Figure 4A:
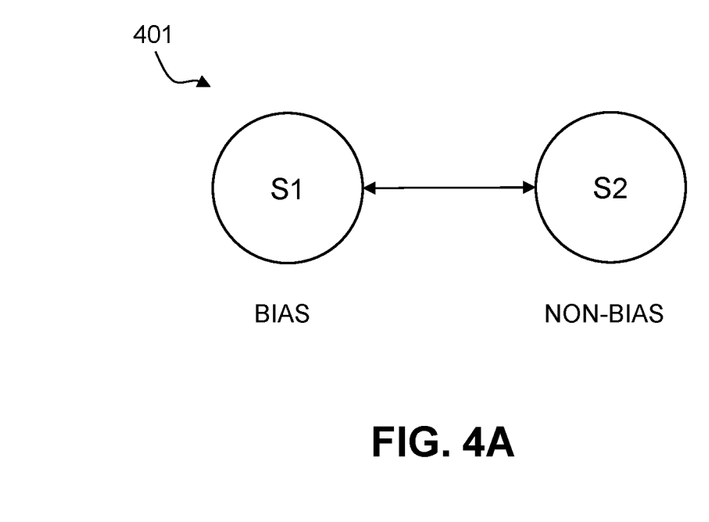
FIGS. 4A-4D are block diagrams showing relationships between storage systems arranged in an active-active configuration during different operational scenarios in illustrative embodiments.

Referring to the block diagram 401 in FIG. 4A, using the non-bias advertising and acknowledgment logic, array S2 advertises its non-bias role to array S1 over a communication link (e.g., RDF link) between array S1 and S2. The non-bias advertising and acknowledgment logic of array S2 generates a signal indicating a non-bias status for array S2, which is transmitted to array S1. The non-bias advertising and acknowledgment logic for array S1 generates a signal comprising an acknowledgement for array S2 of the non-bias status of array S2. In one or more embodiments, the signal comprises an instruction to continue or an acknowledgement that array S2 will continue as the non-bias array in the active-active cluster. The advertising and acknowledgment communications between arrays are periodically sent (e.g., every second, microsecond, etc.).

Additionally, if applicable, the non-bias advertising and acknowledgement messages include a flag (e.g., Boolean flag) indicating a connectivity failure if the sending array receives a message from the host device 102-1 notifying it of a connectivity failure (e.g., SUDDENPATHFALL payload). For example, a non-bias array (e.g., array S2) sets the flag in its advertising message when the non-bias array S2 receives a connectivity failure notification from the host device 102-1. Alternatively, the bias array (e.g., array S1) sets the flag in its acknowledgement message when the bias array S1 receives a connectivity failure notification from the host device 102-1.

In an operational example, if an array (e.g., array 105-1) receives a failure notification indicating a connectivity issue between the host device 102-1 and another array of the active-active configuration (e.g., array 105-2), the receiving array 105-1, if it is designated as the bias array, may maintain its status as the bias array. Alternatively, if the receiving array 105-1 is the non-bias array, the receiving array 105-1 may confirm the bias site failure by sending a non-bias advertising message to the bias array (in this case array 105-2). If there is no acknowledgement communication received from the bias array in response to the non-bias advertising message, the non-bias array determines that the active-active session has failed and automatically changes to take on the role of the bias array.

Figure 4B:
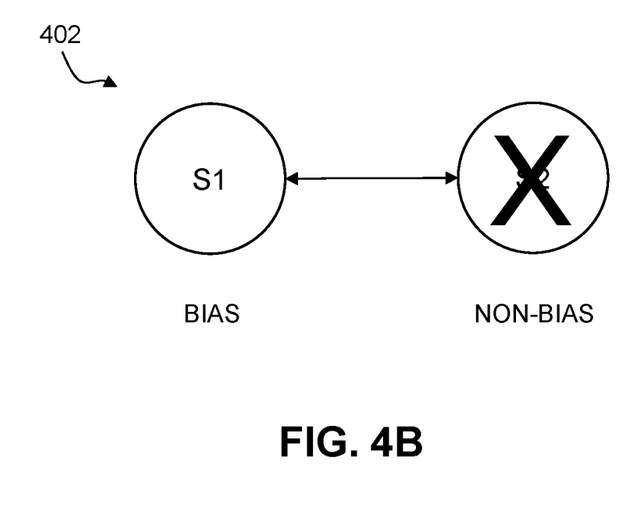

Referring to the block diagram 402 in FIG. 4B, in the event of a failure of the array S2, which is the non-bias site, array S2 is not able to transmit a non-bias advertising message to array S1. If array S1 was previously receiving non-bias advertising messages from array S2, array S1 stops receiving the non-bias advertising signals from array S2. In this situation, the array S1 may also receive a failure payload from the host device (e.g., host device 102-1) generated by the failure notification logic (e.g., failure notification logic 116-1). The storage controller of the array S1 (e.g., a storage controller the same or similar one of the storage controllers 108) processes the lack of a non-bias advertising signal from array S2 and the receipt of the failure payload from the host device to conclude that there has been a failure with the array S2. As a result, the array S1 maintains its status as the bias site since the failure is at the non-bias array S2 and the array S1 is already the bias site. In this situation, the array S1 continues to perform read and write operations (e.g., IO operations) for the host device. In this situation, in view of the receipt of the failure payload from the host device, processing the lack of a non-bias advertising signal may include determining after a predetermined threshold period of time that if no signal is being received, there is a problem with the signal source. Alternatively, the array S1 may conclude solely on the basis of the receipt of the failure payload from the host device that there has been a failure with the array S2. If the issue with the array S2 is later resolved, array S2 returns to a ready state and again sends non-bias advertising messages to array S1.

Figure 4C:
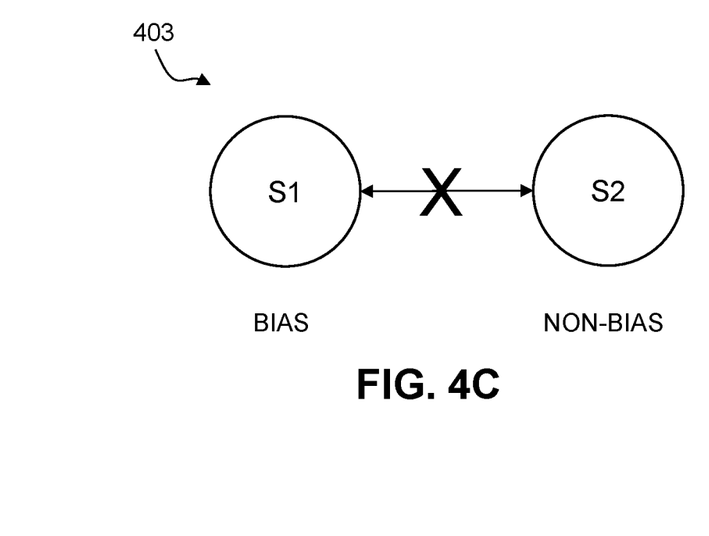

Referring to the block diagram 403 in FIG. 4C, in the event of a failure of a communication link (e.g., RDF link) between arrays S1 and S2, array S1 (bias site) stops receiving non-bias advertising signals from array S2 (non-bias site), and continues to perform read and write operations for the host device (e.g., host device 102-1). Due to the failure of the communication link, the array S2 does not receive any acknowledgement communications from the array S1 that would have been generated by the non-bias advertising and acknowledgment logic of array S1 in response to its non-bias advertising message. Additionally, since there are no path failures between the host device and arrays S1 and S2 as both arrays are up and running in this scenario, neither array S1 nor array S2 receives a failure notification payload from the host device. In this circumstance, based on the lack of the failure notification payload from the host device, and the lack of a non-bias acknowledgement communication from the array S1, the array S2 determines that the active-active session has failed, and automatically enters into a "not ready" state. In this situation, the combination of no failure notification from the host device, and no non-bias acknowledgment message leads the array S2 to conclude that there is a problem with the connection of the array S2 to the array S1. Once the linkage issue between arrays S1 and S2 is resolved, communication is resumed between arrays S1 and S2, with no impact to host device access and application in this scenario. For example, once the linkage issue between arrays S1 and S2 is resolved, array S2 may receive a signal from array S1 and resume sending of the non-bias advertising message to the array S1.

Figure 4D:
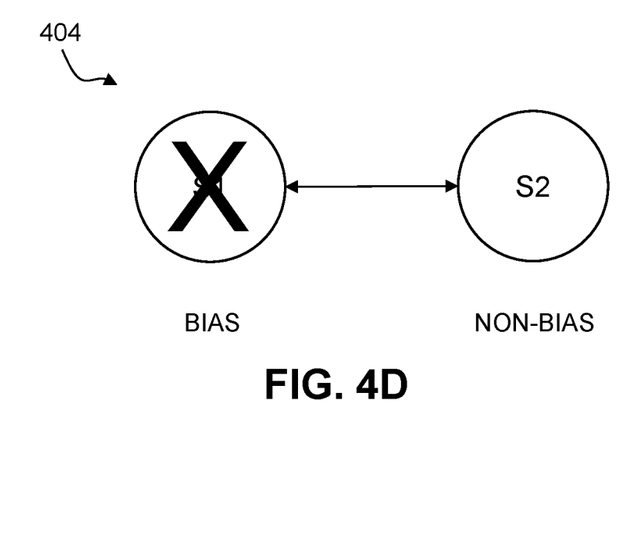

Referring to the block diagram 404 in FIG. 4D, in the event of a failure of the array S1, which is the bias site, when array S2 sends a non-bias advertisement communication to the array S1, no response is received from array S1 since array S1 is down. In other words, due to the failure of the array S1, its non-bias advertising and acknowledgment logic is not able to generate a responsive non-bias acknowledgement communication. In this situation, if there is no acknowledgement response from array S1 and array S2 also receives a path failure notification from the path failure identification logic of the host device, array S2 automatically designates itself as the bias site and performs read and write operations on behalf of the host device. Here, the combination of a lack of acknowledgement response from array S1 and receipt of the failure notification from the host device leads array S2 to conclude a problem with the connection between array S1 and the host device. Alternatively, the array S2 may conclude solely on the basis of the receipt of the failure payload from the host device that there has been a failure with the array S1. In another scenario, if there is no acknowledgement response from array S1 and array S2 does not receive a path failure notification from the path failure identification logic of the host device, similar to the situation in FIG. 4C, the array S2 determines that the active-active session has failed, and array S2 enters into the not ready state. If while in the not ready state, array S2 receives the path failure notification indicating a failure of the array S1, array S2 may conclude a problem with the connection between array S1 and the host device, and then automatically designate itself as the bias array.

Following resolution of the issue at array S1 that caused array S1 to fail, array S1 returns to an active state and waits for a non-bias advertisement message from array S2. If no non-bias advertisement message is received from array S2 and array S1 does not receive a path failure notification from the path failure identification logic of the host device (e.g., when array S2 automatically designated itself as the bias site), array S1 automatically changes its role to non-bias and the non-bias advertising and acknowledgment logic for array S1 generates and sends non-bias advertisement messages to array S2.

In another example, there may be a connectivity failure between a host device and one of the arrays in an active-active configuration. For example, using the designations S1 and S2 for bias and non-bias arrays, in the event of a connectivity failure between the host device and the array S1 (bias array), the array S2 (non-bias array) receives a path failure notification from the path failure identification logic of the host device. In this case, a non-bias advertising message generated by non-bias advertising and acknowledgment logic of the S2 array, and sent from the S2 array to the S1 array, includes a flag indicating a connectivity failure (e.g., SUDDENPATHFALL flag). In response, the non-bias advertising and acknowledgment logic of the S1 array generates an acknowledgement of the non-bias advertising message, but without enabling a flag indicating a path failure, as the S1 array did not receive a path failure notification from the host device due to the connectivity failure between the host device and the S1 array. Due to no flag indicating a path failure in the acknowledgement, the S2 array determines that there has been a failure of connectivity between the host device and the S1 array and automatically switches itself to the bias site, causing the S1 array to become the non-bias site by default.

In a further example, in the event of a connectivity failure between the host device and the array S2 (non-bias array), the array S1 (bias array) receives a path failure notification from the host device. In this case, the S2 array sends a non-bias advertising message with the path failure flag disabled. The S1 array acknowledges the non-bias advertising message, and the acknowledgement sent to the S2 array includes the enabled path failure flag because the S1 array received the path failure notification from the host device. In response, since the acknowledgement message includes the enabled path failure flag and there are no IOs in the data path between the host device and the S2 array, the S2 array concludes that there is a connectivity failure between the host device and the S2 array, and generates a path failure alert.

Referring back to FIG. 1, upon receipt of a payload indicating connectivity failure from failure notification logic 116-1 of a host device 102-1, a storage array 105-1 or 105-2 maintains its status as a bias site, or if designated as the non-bias site and the communication to the other storage array (e.g., RDF link) is active, the storage array 105-1 or 105-2 confirms the bias site failure and automatically changes to the new bias site. The host device 102-1 continues to access the storage volume without application downtime.

The above-described functions associated with connectivity failure identification and notification of the MPIO driver 112-1 are illustratively carried out at least in part under the control of its failure notification logic 116-1. In addition, the above-described functions associated with automated designation of bias and non-bias arrays are illustratively carried out at least in part under the control of the storage controller 108-1 and 108-2 and the non-bias advertising and acknowledgement logic 109-1 and 109-2. For example, the failure notification logic 116-1, the storage controller 108-1 and 108-2 and/or the non-bias advertising and acknowledgement logic 109-1 and 109-2 are illustratively configured to control performance of the steps of the flow diagram and subsequent steps to be described below in conjunction with FIG. 2.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform the disclosed connectivity failure identification and notification functionality. Accordingly, connectivity failure identification and notification functionality described above in the context of the first MPIO driver 112-1 is assumed to be similarly performed by the other MPIO driver 112-2.

In the FIG. 1 embodiment, the network 104 comprises first and second switch fabrics 104A and 104B through which the first and second host devices 102-1 and 102-2 are cross-connected to the first and second storage arrays 105-1 and 105-2 as shown. In a cross-connected arrangement of this type, supporting active-active storage configuration of the storage arrays 105 for the multiple host devices 102, use of conventional path selection in the MPIO drivers 112 of host devices 102 may be employed in illustrative embodiments.

The MPIO drivers 112 may be otherwise configured utilizing well-known MPIO functionality such as that described in "Dell EMC SC Series Storage and Microsoft Multipath IO," Dell EMC, CML1004, July 2018, which is incorporated by reference herein. Such conventional MPIO functionality is suitably modified in illustrative embodiments disclosed herein to support connectivity failure processing.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114, failure notification logic 116 and non-bias advertising and acknowledgement logic 109 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 204, and is suitable for use in the system 100 but is more generally applicable to other types of systems comprising one or more host devices and first and second storage systems. The first and second storage systems in this embodiment are assumed to comprise respective first and second storage arrays arranged in an active-active configuration, with each storage array comprising a plurality of storage devices. The storage devices of the first and second storage arrays are assumed to include logical storage devices such as LUNs or other logical storage volumes.

Figure 2:
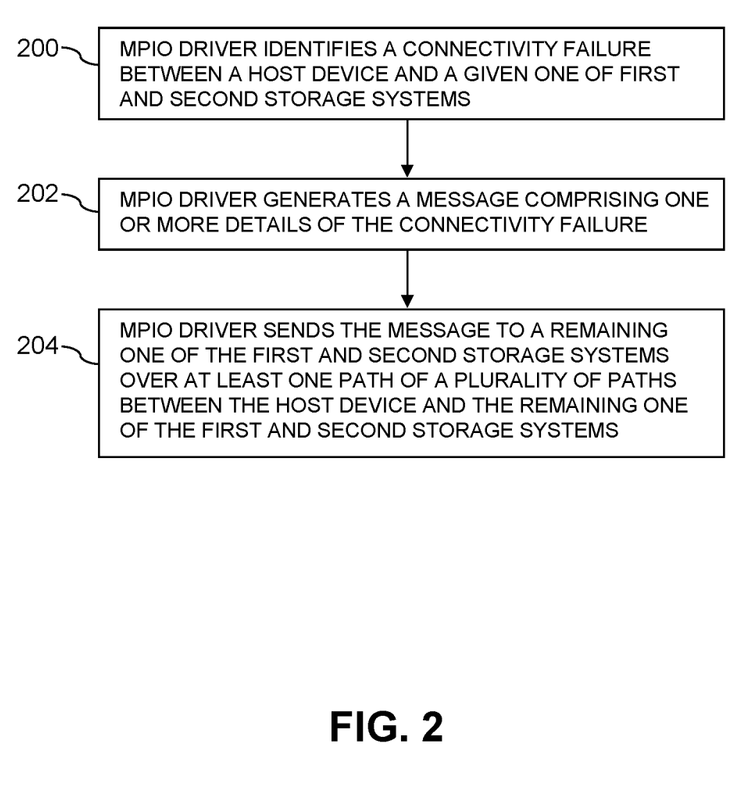
FIG. 2 is a flow diagram of a process for connectivity failure identification and notification utilizing a multi-path layer of a host device in an illustrative embodiment.

The steps of the FIG. 2 process are illustratively performed primarily by or under the control of an MPIO driver of a given host device, such as the MPIO driver 112-1 of the first host device 102-1 of system 100, although other arrangements of system components can perform at least portions of one or more of the steps in other embodiments. The functionality of the FIG. 2 process and subsequently described steps is illustratively performed in conjunction with algorithms executed by the failure notification logic 116-1 of the MPIO driver 112-1, as well as by storage controllers 108-1, 108-2 and non-bias advertising and acknowledgement logic 109-1, 109-2 of storage arrays 105-1, 105-2.

In step 200, an MPIO driver identifies a connectivity failure between a host device and a given one of the first and second storage systems. The first and second storage systems are arranged in an active-active configuration relative to one another. In one or more embodiments, the connectivity failure corresponds to a failure of at least one path of a plurality of paths between the host device and the given one of the first and second storage systems and/or a failure of the given one of the first and second storage systems.

In step 202, the MPIO driver generates a message comprising one or more details of the connectivity failure. In an embodiment, the message comprises an information packet payload and the one or more details identify a number of unavailable paths between the host device and the given one of the first and second storage systems.

In step 204, the MPIO driver sends the message to a remaining one of the first and second storage systems over at least one path of a plurality of paths between the host device and the remaining one of the first and second storage systems.

In an embodiment, one storage system of the first and second storage systems is designated as a non-bias storage system and the other storage system of the first and second storage systems is designated as a bias storage system. Responsive to receipt of the message comprising one or more details of the connectivity failure, the other storage system is configured to maintain the designation as the bias storage system, and the one storage system is configured to switch from the designation as the non-bias storage system to a subsequent designation as the bias storage system.

According to an embodiment, the one storage system is configured to transmit to the other storage system a signal indicating the non-bias storage system designation of the one storage system. Responsive to receipt of the signal indicating the non-bias storage system designation, the other storage system is configured to transmit to the one storage system a signal acknowledging the non-bias storage system designation. The one storage system is configured to switch from the designation as the non-bias storage system to a subsequent designation as the bias storage system responsive to receipt of the message comprising the one or more details of the connectivity failure and responsive to a failure to receive the signal acknowledging the non-bias storage system designation from the other storage system. The one storage system is configured to switch to an unavailable state responsive a failure to receive the signal acknowledging the non-bias storage system designation from the other storage system and a lack of the message comprising the one or more details of the connectivity failure from the host device.

Responsive to receipt of the message comprising the one or more details of the connectivity failure, the one storage system is configured to transmit the signal indicating the non-bias storage system designation with a flag identifying the connectivity failure. The one storage system is configured to switch from the designation as the non-bias storage system to a subsequent designation as the bias storage system responsive to receipt of the signal acknowledging the non-bias storage system designation from the other storage system without a return flag identifying the connectivity failure.

Responsive to receipt of the message comprising the one or more details of the connectivity failure, the other storage system is configured to transmit the signal acknowledging the non-bias storage system designation with a flag identifying the connectivity failure.

Different instances of the FIG. 2 process can execute at least in part in parallel with one another for different extended copy commands. Also, multiple additional instances of the FIG. 2 process are assumed to be performed in respective ones of one or more additional host devices that share multiple storage arrays arranged in an active-active configuration.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and active-active configuration management functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different active-active arrangements in the event of a failure within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
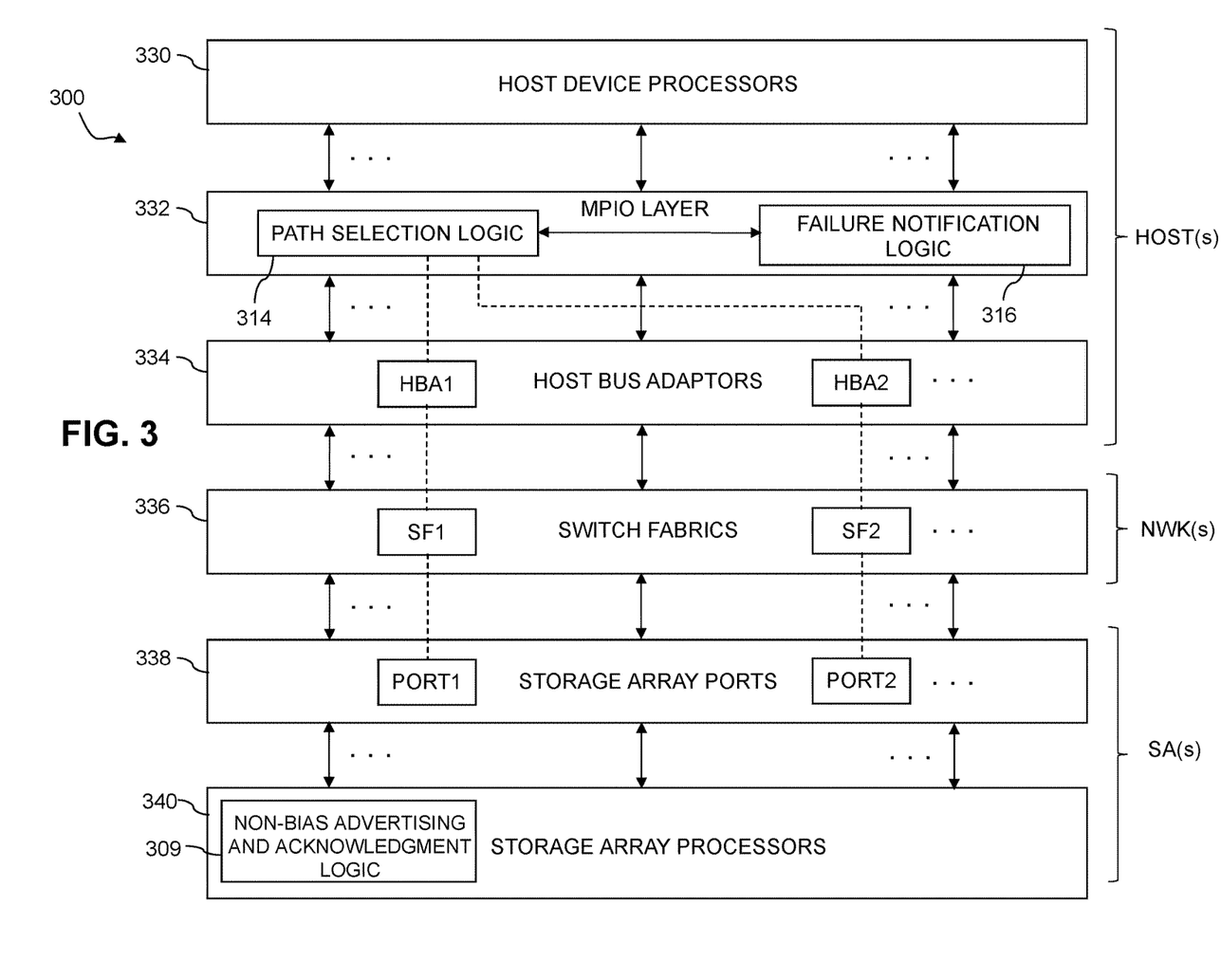
FIG. 3 is a block diagram showing multiple layers of a layered system architecture that includes a multi-path layer with connectivity failure identification and notification functionality in an illustrative embodiment.

Referring now to FIG. 3, another illustrative embodiment is shown. In this embodiment, an information processing system 300 comprises, path selection logic 314, failure notification logic 316 and non-bias advertising and acknowledgment logic 309. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices ("HOSTs"), the switch fabric layer 336 is associated with one or more SANs or other types of networks ("NWKs"), and the storage array port layer 338 and storage array processor layer 340 are associated with one or more storage arrays ("SAs").

The system 300 in this embodiment effectively handles IO path, array, host connectivity and RDF link failures without third party mediator (e.g., witness) arrays. The embodiments utilize failure notification logic 316 to send failure notifications to a storage array processor layer 340, which uses non-bias advertising and acknowledgment logic 309 to automatically use one of the storage arrays in an active-active configuration for IO operations in the event of a failure of another one of the storage arrays, connectivity problems between the storage arrays and/or connectivity problems between a host device and one of the storage arrays.

The MPIO layer 332 is an example of what is also referred to herein as a multi-path layer, and comprises one or more MPIO drivers implemented in respective host devices. Each such MPIO driver illustratively comprises an instance of failure notification logic 316, which identifies connectivity failures between host devices and respective ones of a plurality of storage arrays, confirms array connectivity issues and sends messages comprising details of the connectivity failures over available paths to arrays without connectivity issues, substantially as previously described. Additional or alternative layers and failure notification logic arrangements can be used in other embodiments. As mentioned previously, different instances of the above-described connectivity failure identification and failure processes can be performed by different MPIO drivers in different host devices.

The non-bias advertising and acknowledgment logic 309 implemented in the storage array processor layer 340 controls the active-active configuration of a given pair of storage arrays. For example, the non-bias advertising and acknowledgment logic 309 can include functionality for sending messages between arrays in an active-active array configuration, where one of the arrays advertises its non-bias role to the other array, which is the bias array. The non-bias advertising and acknowledgment logic 309 also includes functionality for concluding whether there has been a failure of a storage array and/or a failure of connection to a storage array of the active-active configuration (e.g., connection between a host device and storage array and/or connection between storage arrays), and for automated designation of bias or non-bias status of a storage array depending on the conclusion. It is also possible in some embodiments that the non-bias advertising and acknowledgment logic 309 can include multiple distinct non-bias advertising and acknowledgment logic instances for respective ones of a plurality of storage arrays of the system 300. Although not explicitly shown in the figure, additional non-bias advertising and acknowledgment logic is illustratively implemented elsewhere in the system 300.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations and/or commands to the one or more storage arrays having the storage array ports of the storage array port layer 338. In selecting the paths, the path selection logic 314 illustratively limits amounts of IO operations and/or commands that are delivered over one or more paths to particular ones of the ports of a storage array.

In this embodiment, the host devices through their respective MPIO drivers and respective instances of path selection logic 314 and failure notification logic 316 provide functionality for identification and notification of connectivity failures, possibly with involvement of other host device components. In addition, the storage arrays through their respective storage array processors and respective instances of non-bias advertising and acknowledgment logic 309 provide functionality for communication between and management of bias and non-bias statuses of the storage arrays in an active-active configuration.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the WIPIO drivers of a multi-path layer is typically supported. Other types of host devices using other operating systems such as AIX in some implementations do not necessarily support such automated path discovery, in which case alternative techniques can be used to discover paths.

The active-active configuration according to an embodiment may more particularly comprise a Symmetrix® Remote Data Facility (SRDF)/metro configuration, which facilitates replication of data from one Symmetrix° storage array to another through a SAN or an IP network, although a wide variety of other active-active configurations involving different types of storage arrays can be used.

In such a configuration, logical devices may be non-SRDF/local devices or SRDF/metro devices. A non-SRDF/local device is local to the first storage array and has no paired logical device on the second storage array, while an SRDF/metro device has a paired logical device in the second storage array. For example, consider a logical device R1 on the first storage array and a logical device R2 on the second storage array. With the SRDF/metro configuration, R1 can be paired with R2 such that R2 takes on the identity of R1 and is read/write accessible to the host device. The MPIO driver creates a single logical device for the paired devices R1 and R2 on the respective first and second storage arrays, thereby providing the host device with visibility into both the first and second storage arrays.

Some embodiments include only a single host device, although multiple host devices may be used in illustrative embodiments. For example, a single host device can be connected to two storage arrays that are arranged in an active-active configuration.

The particular arrangements for addressing connectivity failures described above are presented by way of illustrative example only. Numerous alternative arrangements of these and other features can be used in implementing connectivity failure processing in other embodiments.

The illustrative embodiments disclosed herein can provide a number of significant advantages relative to conventional arrangements that require third party mediator arrays (e.g., witness arrays) to manage inconsistencies between replicated storage arrays (e.g., split-brain scenarios). Unlike solutions that use witness arrays, which have an increased probability of failure due to the need for stable connectivity and management of the witness arrays, the embodiments advantageously configure a multi-path layer of one or more host devices to include functionality for address failure scenarios without using a witness configuration, thereby providing high availability enterprise storage options using simplified configurations. These embodiments provide a significant advance over conventional techniques, which do not configure host devices to notify storage arrays of connectivity failures. For example, illustrative embodiments are advantageously configured to enable hosts to identify lost paths due to connectivity failures, and to notify remaining storage arrays of the details of the failure.

Advantageously, the embodiments further enable storage arrays to communicate with each other to advertise and acknowledge non-bias and bias roles, and send flags indicating receipt of failure notifications from a host device. In one or more embodiments, the storage arrays process whether failure notifications have been received from a host devices, and whether non-bias advertising or acknowledgement messages have been received from another storage array of an active-configuration and use the results of the processing to determine whether to maintain or switch from a non-bias or bias status.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114, failure notification logic 116 and non-bias advertising and acknowledgment logic 109 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, failure notification logic, non-bias advertising and acknowledgment logic and additional or alternative components. Also, the particular configurations of system and device elements and associated processing operations illustratively shown in the drawings can be varied in other embodiments. For example, a wide variety of different MPIO driver configurations and associated connectivity failure processing arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with first and second storage systems;
the host device comprising:
a multi-path input-output driver configured to control delivery of input-output operations from the host device to the first and second storage systems over selected paths through the network;
wherein the multi-path input-output driver is further configured;

to identify a connectivity failure between the host device and a given one of the first and second storage systems;

to generate a message comprising one or more details of the connectivity failure; and to send the message to a remaining one of the first and second storage systems over at least one path of a plurality of paths between the host device and the remaining one of the first and second storage systems.

2. The apparatus of claim 1 wherein the first and second storage systems are arranged in an active-active configuration relative to one another.

3. The apparatus of claim 2 wherein one storage system of the first and second storage systems is designated as a non-bias storage system and another storage system of the first and second storage systems is designated as a bias storage system.

4. The apparatus of claim 3 wherein the other storage system is configured to maintain the designation as the bias storage system responsive to receipt of the message comprising the one or more details of the connectivity failure.

5. The apparatus of claim 3 wherein the one storage system is configured to switch from the designation as the non-bias storage system to a subsequent designation as the bias storage system responsive to receipt of the message comprising the one or more details of the connectivity failure.

6. The apparatus of claim 3 wherein the one storage system is configured to transmit to the other storage system a signal indicating the non-bias storage system designation of the one storage system.

7. The apparatus of claim 6 wherein, responsive to receipt of the signal indicating the non-bias storage system designation, the other storage system is configured to transmit to the one storage system a signal acknowledging the non-bias storage system designation.

8. The apparatus of claim 7 wherein the one storage system is configured to switch from the designation as the non-bias storage system to a subsequent designation as the bias storage system responsive to receipt of the message comprising the one or more details of the connectivity failure and responsive to a failure to receive the signal acknowledging the non-bias storage system designation from the other storage system.

9. The apparatus of claim 7 wherein the one storage system is configured to switch to an unavailable state responsive to a failure to receive the signal acknowledging the non-bias storage system designation from the other storage system and a lack of the message comprising the one or more details of the connectivity failure from the host device.

10. The apparatus of claim 7 wherein, responsive to receipt of the message comprising the one or more details of the connectivity failure, the one storage system is configured to transmit the signal indicating the non-bias storage system designation with a flag identifying the connectivity failure.

11. The apparatus of claim 10 wherein the one storage system is configured to switch from the designation as the non-bias storage system to a subsequent designation as the bias storage system responsive to receipt of the signal acknowledging the non-bias storage system designation from the other storage system without a return flag identifying the connectivity failure.

12. The apparatus of claim 7 wherein, responsive to receipt of the message comprising the one or more details of the connectivity failure, the other storage system is configured to transmit the signal acknowledging the non-bias storage system designation with a flag identifying the connectivity failure.

13. The apparatus of claim 1 wherein the connectivity failure corresponds to a failure of at least one path of a plurality of paths between the host device and the given one of the first and second storage systems.

14. The apparatus of claim 1 wherein the connectivity failure corresponds to a failure of the given one of the first and second storage systems.

15. The apparatus of claim 1 wherein the message comprises an information packet payload and the one or more details identify a number of unavailable paths between the host device and the given one of the first and second storage systems.

16. A method comprising:

configuring a multi-path input-output driver of a host device to control delivery of input-output operations from the host device to first and second storage systems over selected paths through a network;

the multi-path input-output driver:

identifying a connectivity failure between the host device and a given one of the first and second storage systems;

generating a message comprising one or more details of the connectivity failure; and sending the message to a remaining one of the first and second storage systems over at least one path of a plurality of paths between the host device and the remaining one of the first and second storage systems.

17. The method of claim 16 wherein:

the first and second storage systems are arranged in an active-active configuration relative to one another; and one storage system of the first and second storage systems is designated as a non-bias storage system and another storage system of the first and second storage systems is designated as a bias storage system.

18. The method of claim 17 wherein the one storage system is configured to switch from the designation as the non-bias storage system to a subsequent designation as the bias storage system responsive to receipt of the message comprising the one or more details of the connectivity failure.

19. A computer program product comprising a non-transitory processor-readable storage medium having stored therein program code of one or more software programs, wherein the program code, when executed by a host device comprising a multi-path input-output driver, the multi-path input-output driver being configured to control delivery of input-output operations from the host device to first and second storage systems over selected paths through a network, causes the multi-path input-output driver:

to identify a connectivity failure between the host device and a given one of the first and second storage systems;

to generate a message comprising one or more details of the connectivity failure; and to send the message to a remaining one of the first and second storage systems over at least one path of a plurality of paths between the host device and the remaining one of the first and second storage systems.

20. The computer program product of claim 19 wherein:

the first and second storage systems are arranged in an active-active configuration relative to one another;

one storage system of the first and second storage systems is designated as a non-bias storage system and another storage system of the first and second storage systems is designated as a bias storage system; and the one storage system is configured to switch from the designation as the non-bias storage system to a subsequent designation as the bias storage system responsive to receipt of the message comprising the one or more details of the connectivity failure.

* * * * *